Patented Oct. 20, 1925.

1,558,262

UNITED STATES PATENT OFFICE.

GUYON F. GREENWOOD, OF GEORGEVILLE, QUEBEC, CANADA, ASSIGNOR OF ONE-HALF TO ROBERT B. HUTCHESON, OF MONTREAL, QUEBEC, CANADA.

REDUCTION OF ORES.

No Drawing. Application filed January 31, 1923. Serial No. 616,177.

*To all whom it may concern:*

Be it known that I, GUYON F. GREENWOOD, a citizen of the Dominion of Canada, residing at Georgeville, Province of Quebec, Canada, have invented certain new and useful Improvements in the Reduction of Ores, of which the following is a specification.

My invention relates in general to the reduction of ores, and more particularly to the reduction of iron ore by means of carbon in one form or another. As applied to the treatment of iron ore it comprises the use of carbon as a reducing agent under such conditions as will prevent the formation of a chemical compound between the metal and carbon, which is always incidental to the present-day practice of metallurgical reduction by carbon.

It is known that carbon will chemically unite with iron at temperatures within the range from about 200° C. to 680° or 700° C. at ordinary atmospheric pressure. Above these upper limits the compound of iron and carbon is not formed until another higher temperature considerably above these upper limits is reached and within this range above 680° or 700° C. is the most effective temperature for the reducing of iron oxide by means of carbon. In ordinary practice, the charge of ore and carbon together with the desired flux such as limestone or silicate is heated from atmospheric temperature up to the reducing temperature and as the temperature is raised through the range at which carbon and iron will chemically unite, a compound of iron and carbon is formed which is not dissociated within the usual reduction temperature range. The result, therefore, is the usual pig iron of commerce which always contains an unavoidable content of carbon chemically united with the iron.

According to my invention, I avoid this objectionable feature by separately preheating the carbon on the one hand and the ore and flux on the other hand, to a temperature above the combining temperature range of iron and carbon, but within the reducing temperature range of the iron oxides, and then mix the two separately preheated constituents together and maintain the temperature at the reduction temperature, which will be in the neighborhood of 700° C. The reduction of hematite ore, for example, in which the iron is present as $Fe_2O_3$, by means of carbon, requires the supply of a certain quantity of chemical heat units, in order to maintain the reducing temperature at the proper figure. The compound $Fe_2O_3$ represents, for example, 195,600 heat units. The oxidation of carbon to CO gas represents 29,160 heat units. To satisfy the reaction $Fe_2O_3 + 3C = 2Fe + 3CO$ requires the introduction of 87,480 chemical heat units from an extraneous source in order to maintain the reaction temperature constant. If the temperature rises above the maximal, incomplete reduction may result, whereas if the temperature drops below the maximal, the formation of carbide of iron is threatened. It is, therefore, important to effectively maintain the temperature within proper limits which will be approximately 700° C. This may be accomplished by electrical heating under control of suitable thermostatic mechanism. The CO gas produced by the reduction is withdrawn or allowed to escape and may be employed as a source of power by burning under a steam boiler or in an internal combustion engine to run the dynamo. The preheating may, for example, occur to a temperature somewhat above the preferred reducing temperature range, the carbon, for example, being heated to about 1000° C., whereas the ore and flux, assuming a calcium carbonate flux is used, is heated to 900° C. separately from the carbon. This latter temperature results in the setting free of $CO_2$ gas which is allowed to escape. The ingredients prior to being mixed together, or in the act of mixing them together, may be permitted to lose sufficient heat to lower the temperature to the preferred figure of approximately 700° C. and the temperature thereafter is maintained at the desired point for most effective reduction, by the electrical means described.

The reduced charge may then be run into a slagging furnace such as an electric furnace and the slag poured, after which the molten mass of reduced iron substantially free from carbon may be obtained as the product, or suitable addition agents may be incorporated either prior to or after the pouring of one or more slags, so as to obtain as a product the desired steel or alloy composition.

The invention provides an economical and reliable method of gaining steel, or alloy, or substantially pure iron direct from the ore, without the use of the present-day blast furnace method of first producing pig iron.

The occurrence of silicon chemically combined with the iron may also be avoided by operating within the temperature conditions set forth.

The principle of operation which is embodied in the invention is applicable generally to those situations where ingredients are present which are able to unite with the metal at temperatures lower than the reducing temperature employed but which are unable to unite with the metal within the selected temperature range at which the reduction is carried on. In all such cases, the material which might react with the metal at the lower temperature is separately preheated to what we might term the non-combining temperature and only then introduced into the ore which is also already heated to a point above the combining temperature.

I claim:—

1. The method of reducing ores which comprises separately preheating the ore and a reducing agent which is able to unite with the metal to a temperature above their combining temperature range, and subsequently bringing them together in such preheated state and maintaining them at a selected reducing temperature above their combining temperature range during the process of reduction of the ore.

2. The method of reducing oxide ores by carbon which comprises separately preheating the carbon and ore to a reducing temperature above the combining temperature of the carbon and metal, and thereafter bringing together the carbon and the ore and performing the reduction at a temperature outside of the combining temperature range of the carbon and metal.

GUYON F. GREENWOOD.